United States Patent [19]

Leland

[11] Patent Number: 4,504,551

[45] Date of Patent: Mar. 12, 1985

[54] POLY(ARYLENE SULFIDE) COMPOSITIONS

[75] Inventor: John E. Leland, Bartlesville, Okla.

[73] Assignee: Phillips Petroleum Company, Bartlesville, Okla.

[21] Appl. No.: 489,446

[22] Filed: Apr. 28, 1983

[51] Int. Cl.³ .......................... C08K 3/40; C08L 81/04
[52] U.S. Cl. .................................... 428/419; 524/423; 524/432; 524/451; 524/456; 524/609; 428/543
[58] Field of Search ............... 524/456, 609, 451, 423, 524/432; 428/542, 543

[56] References Cited

U.S. PATENT DOCUMENTS

| | | | |
|---|---|---|---|
| 4,000,347 | 12/1976 | Ranney et al. | 428/450 |
| 4,044,037 | 8/1977 | Mui et al. | 528/30 |
| 4,151,157 | 4/1979 | Williams et al. | 524/572 |
| 4,176,098 | 11/1979 | Needham | 524/445 |
| 4,262,661 | 4/1981 | Needham | 524/609 |
| 4,269,756 | 5/1981 | Su | 524/327 |
| 4,337,182 | 6/1982 | Needham | 523/213 |
| 4,350,786 | 9/1982 | Blackwell et al. | 524/609 |
| 4,365,037 | 12/1982 | Adachi et al. | 524/609 |
| 4,374,943 | 2/1983 | Williams | 523/211 |

*Primary Examiner*—Herbert J. Lilling

[57] ABSTRACT

At least one of certain silanes is added to a poly(arylene sulfide) composition. The silane increases the electrical insulation resistance of the composition.

55 Claims, No Drawings

POLY(ARYLENE SULFIDE) COMPOSITIONS

This invention relates to poly(arylene sulfide) compositions. In one aspect this invention relates to electronic components made from poly(arylene sulfide) compositions. In another aspect this invention relates to electronic components encapsulated with poly(arylene sulfide) components. In yet another aspect this invention relates to poly(arylene sulfide) compositions containing at least one silane.

BACKGROUND AND OBJECTS

Poly(arylene sulfide) compositions can be used in the manufacture of electronic components such as, for example, connectors, bobbins, coils, relays, etc. Poly(arylene sulfide) compositions can also be used to encapsulate electronic components.

High insulation resistance is a much desired characteristic in such poly(arylene sulfide) compositions. One of the objects of this invention is to provide a poly(arylene sulfide) composition having high insulation resistance. Another object of this invention is to provide electronic components made from or encapsulated with a poly(arylene sulfide) composition of high insulation resistance.

Although my invention is well suited for use in the area of electronic components and encapsulation thereof, the scope of my invention is not limited thereto. Accordingly, it is also an object of this invention to provide a novel poly(arylene sulfide) composition. Many uses for poly(arylene sulfide) compositions (especially poly(phenylene sulfide) compositions) are known; others have yet to be discovered.

Other objects, advantages and aspects of this invention will become apparent to persons skilled in the art upon study of this disclosure and the appended claims.

BRIEF SUMMARY OF THE INVENTION

The composition of this invention is made from poly(arylene sulfide) and at least one silane selected from a specifically defined group. The composition can additionally contain, as desired, reinforcements, fillers, zinc oxide, processing aids, pigments, additives, etc. The composition can be used in the manufacture of electronic components as an encapsulation composition and the invention includes, as one of its aspects, electronic components made from or encapsulated therewith. The silane imparts to the poly(arylene sulfide) composition an increase in insulation resistance that makes the composition well suited for electronic applications. The invention, however, includes the composition per se and is not limited to electronic applications. This invention is further, and more completely, described in the disclosure and claims which follow.

DETAILED DESCRIPTION OF THE INVENTION

1. The Composition

The composition of this invention is a combination of poly(arylene sulfide) and at least one silane within formula I given below:

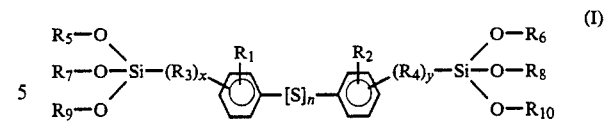

The number of sulfur atoms (S) linking the two aromatic groups is determined by the value of n which represents a positive integer and ranges from 1 to 30. A subgenus within the scope of this invention is represented by formula I wherein n ranges from 1 to 10. The preferred value for n is from 1 to 5.

Each of $R_1$ and $R_2$ is H or an alkyl group having from 1 to 30 carbon atoms. Each of $R_5$, $R_6$, $R_7$, $R_8$, $R_9$, and $R_{10}$ is an alkyl group having from 1 to 30 carbon atoms. The alkyl groups associated with $R_1$, $R_2$, $R_5$, $R_6$, $R_7$, $R_8$, $R_9$ and $R_{10}$ can be linear (e.g. n-propyl) or branched (e.g. tert-butyl). Examples of alkyl groups within the scope of this invention include, but are not limited to, the following:

—$CH_3$
—$CH_2CH_3$
—$CH_2CH_2CH_3$
—$CH_2CH_2CH_2CH_3$

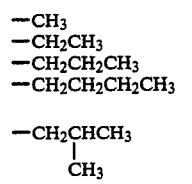

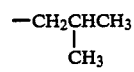

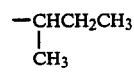

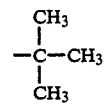

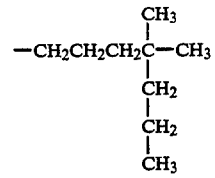

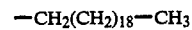

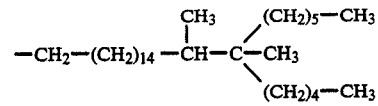

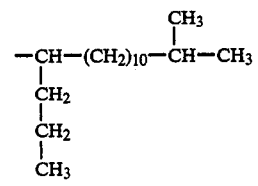

A subgenus within the scope of this invention is represented by formula I wherein each of $R_1$ and $R_2$ is H or an alkyl group having from 1 to 10 carbon atoms and each of $R_5$, $R_6$, $R_7$, $R_8$, $R_9$ and $R_{10}$ is an alkyl group having from 1 to 10 carbon atoms. Preferably, each of $R_1$ and $R_2$ is H or an alkyl group having from 1 to 5 carbon atoms and each of $R_5$, $R_6$, $R_7$, $R_8$, $R_9$ and $R_{10}$ is an alkyl group having from 1 to 5 carbon atoms. In an embodiment of this invention each of $R_1$ and $R_2$ represents a methyl group (—$CH_3$) and each of $R_5$, $R_6$, $R_7$, $R_8$, $R_9$ and $R_{10}$ represents an ethyl group (—$CH_2CH_3$).

Each of the letters x and y represents either 1 or 0. When $x=0$, $R_3$ is absent from formula I and the Si bond extends to a carbon member of the corresponding aromatic ring. When $x=1$, $R_3$ is as defined below. In a similar manner when $y=0$, $R_4$ is absent from formula I and the Si bond extends to a carbon member of the corresponding aromatic ring. When $y=1$, $R_4$ is as defined below.

Each of $R_3$ and $R_4$, when present (i.e. when $x=1$, $y=1$), is an alkylene group having from 1 to 30 carbon atoms. The alkylene group can be linear or branched. Examples of alkylene groups within the scope of this invention include, but are not limited to, the following:

present) is an alkylene group having from 1 to 10 carbon atoms. Preferably, each of $R_3$ and $R_4$ (when present) is an alkylene group having from 1 to 5 carbon atoms. In an embodiment of this invention each of $R_3$ and $R_4$ is present (i.e. $x=1$ and $y=1$) and represents an ethylene group (i.e. —$CH_2CH_2$—).

$R_1$ and $R_3$ (or Si when $x=0$) can be bonded to any available carbon atom of the corresponding aromatic ring. The position of $R_1$ with respect to the sulfur substituent can be ortho, meta or para. The position of $R_3$ (or Si when $x=0$) with respect to the sulfur substituent can be ortho, meta or para. In a similar manner $R_2$ and $R_4$ (or Si when $y=0$) can be bonded to any available carbon atom of the corresponding aromatic ring. The position of $R_2$ with respect to the sulfur substituent can be ortho, meta or para. The position of $R_4$ (or Si when $y=0$) with respect to the sulfur substituent can be ortho, meta or para. Examples of various orientations within the scope of this invention include, but are not limited to, the following.

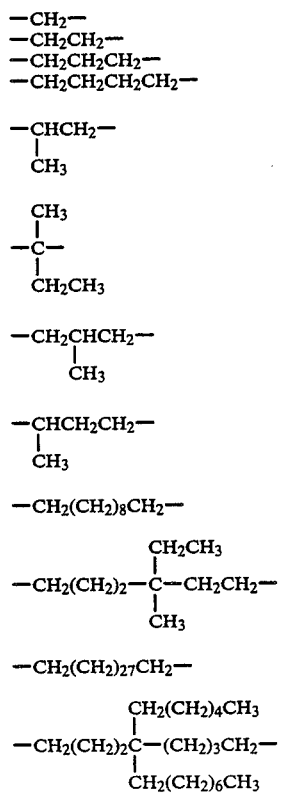

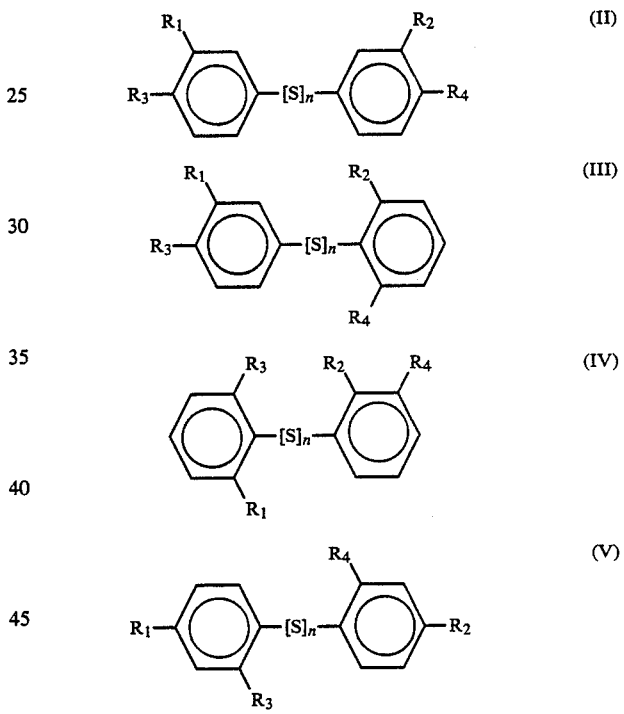

The preferred silane compounds of this invention are defined by the following chemical formula:

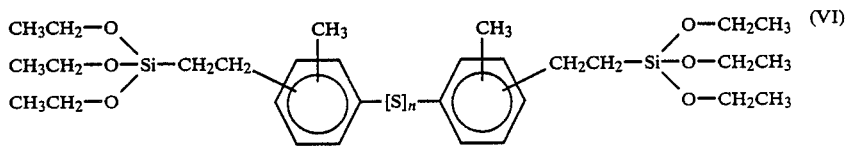

A subgenus within the scope of this invention is represented by formula I wherein each of $R_3$ and $R_4$ (when where n is an integer from 1 to 5. Included are all positional isomers of the above. Examples include, but are not limited to, the following:

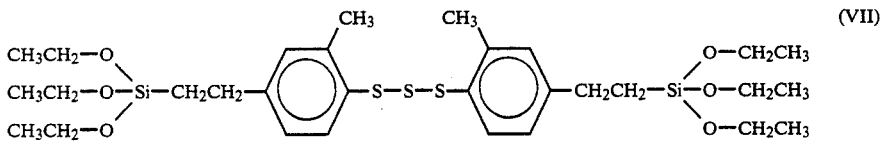

(VII)

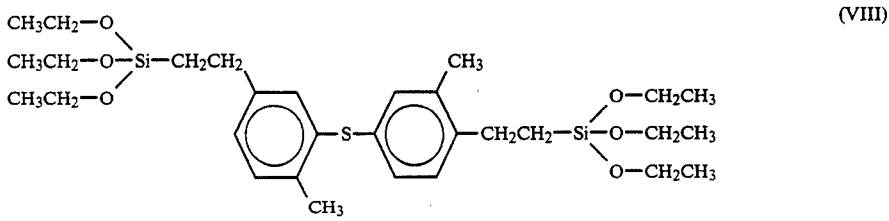

(VIII)

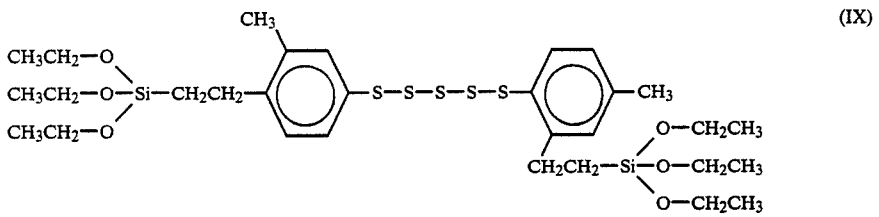

(IX)

The composition can contain more than one silane within the scope of formula I. By way of non-limiting example the poly(arylene sulfide) composition can contain the compounds VII, VIII and IX above. In one embodiment of this invention the poly(arylene sulfide) composition contains two or more silanes defined by

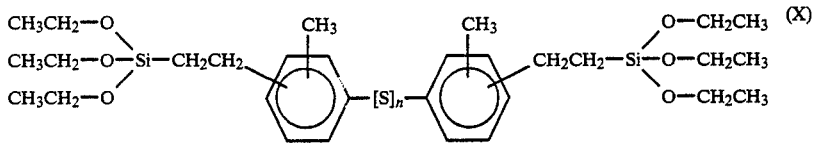

(X)

wherein the average value of n for the mixture is about 2 to about 4 and preferably about 2.8.

For the purposes of this disclosure and the appended claims the term poly(arylene sulfide) is intended to designate arylene sulfide polymers. Uncured or partially cured poly(arylene sulfide) polymers whether homopolymer, copolymer, terpolymer, and the like, or a blend of such polymers, can be used in the practice of my invention. The uncured or partially cured polymer is a polymer the molecular weight of which can be increased by either lengthening of a molecular chain or by cross-linking or by combination of both by supplying thereto sufficient energy, such as heat. Suitable poly(arylene sulfide) polymers include, but are not limited to, those described in U.S. Pat. No. 3,354,129, incorporated by reference herein.

Some examples of poly(arylene sulfide) suitable for the purposes of our invention include poly(2,4-tolylene sulfide), poly(4,4'-biphenylene sulfide) and poly(phenylene sulfide). Because of its availability and desirable properties (such as high chemical resistance, nonflammability, and high strength and hardness) poly(phenylene sulfide) is the presently preferred poly(arylene sulfide).

In addition to poly(arylene sulfide) and at least one silane the composition can also include, if desired, other materials such as, but not limited to, fillers, reinforcements, processing aids, flow improvers, additives, pigments, etc.

Fillers can be used to improve the dimensional stability, thermal conductivity and mechanical strength of the composition. Some suitable fillers include, for example, talc, silica, clay, alumina, calcium sulfate, calcium carbonate, mica and so on. The fillers can be in the form of, for example, powder, grain or fiber. In selecting a filler for an encapsulation composition the following factors should be considered:

(1) the electrical conductivity of the filler (the lower the better);

(2) the thermal stability of the filler at encapsulation temperatures; and (3) the level of ionic impurities in the filler.

Suitable reinforcements include fibers of glass or calcium silicate (e.g. wollastonite). Examples of other reinforcements include, but are not limited to glass or calcium silicate in nonfibrous form (e.g. beads, powders, grains, etc.) and fibers of other materials such as asbestos, ceramics, etc.

Although this invention is not limited thereto, a hydrogenated conjugated diene/monovinyl-substituted aromatic copolymer can be included in the poly(arylene sulfide) composition. An example of such a copolymer is hydrogenated butadiene/styrene copolymer. Others are known to persons skilled in the art.

The electrical properties of the encapsulation composition of this invention can also be improved by the addition of zinc oxide.

Besides reinforcements, fillers, copolymers and zinc oxide the compositions can optionally contain relatively small amounts of other ingredients such as, but not limited to, pigments, flow improvers, and processing aids.

There is no maximum limit nor minimum limit to the amount of silane (formula I) that can be employed in the composition of this invention. It is contemplated, however, that the weight ratio of poly(arylene sulfide) to silane will generally be greater than about 2 to 1 and less than about 5,000 to 1. More typically this weight ratio will be greater than about 7 to 1 and less than about 500 to 1. The weight ratio is the ratio of the weight of poly(arylene sulfide) in the composition to the weight of silane in the composition. This weight ratio is calculated with disregard to the presence or absence of other materials, if any, in the composition. If a plurality of silanes is employed the sum of the weights of these silanes is used to calculate the weight ratio.

When other materials are included in the composition the composition will consist of (a) poly(arylene sulfide), (b) at least one silane (formula I) and (c) materials other than (a) or (b) (i.e. "other materials"). Generally, the amount of other materials in the composition will not exceed about 90 weight percent of the composition. More typically the amount of other materials in the composition will not exceed about 75 weight percent. The above weight percentages are calculated on the basis of the total weight of (a), (b) and (c).

$$\text{Weight \%} = \frac{(c)}{(a) + (b) + (c)} \times 100\%$$

The amount of silane (formula I) to be employed in the composition can also be defined in functional language as the amount sufficient to impart improved insulation resistance to the composition. Improved insulation resistance means that the composition having the silane has better insulation resistance than a composition which does not have the silane but which is otherwise identical in type to the first composition. Insulation resistance can be measured in accordance with the procedure used in the example of this specification.

2. Article of Manufacture

In accordance with one aspect of this invention electronic components such as, but not limited to, connectors, bobbins, coils, relays, etc. are at least partially made from the poly(arylene sulfide) composition of this invention. This aspect of the invention includes all electronic components that can be at least partially made from a resinous composition such as a poly(arylene sulfide) composition.

In accordance with another aspect of this invention electronic components are encapsulated with the poly(arylene sulfide) composition of this invention. The electronic components to be encapsulated in accordance with our invention broadly include all electronic components (i.e. devices, parts, etc.) for which encapsulation is desired. The term electronic component is intended to be broadly construed and includes, by way of non-limiting example, the following:
capacitors,
resistors,
resistor networks,
integrated circuits,
transistors,
diodes,
triodes,
thyristors,
coils,
varistors,
connectors,
condensers,
transducers,
crystal oscillators,
fuses,
rectifiers,
power supplies, and
microswitches.

The definition of each of the above-identified electronic components is similarly intended to be broad and comprehensive. The term integrated circuit, for example, is intended to include, but is not limited to,
large scale integrated circuits,
TTL (transistor transistor logic),
hybrid integrated circuits,
linear amplifiers,
operational amplifiers,
instrumentation amplifiers,
isolation amplifiers,
multipliers and dividers,
log/antilog amplifiers,
RMS-to-DC converters,
voltage references,
transducers,
conditioners,
instrumentation,
digital-to-analog converters,
analog-to-digital converters,
voltage/frequency converters,
synchro-digital converters,
sample/track-hold amplifiers,
CMOS switches and multiplexers,
data-acquisition subsystems,
power supplies,
memory integrated circuits,
microprocessors,
and so on.

The composition used to make or encapsulate the electronic component is broadly described in 1. above. A composition especially well suited for use in the manufacture of electronic components includes about 50 to 70 weight percent poly(arylene sulfide), about 30 to about 50 weight percent reinforcement (e.g. glass fibers) and about 0.1 to about 5 weight percent silane (formula I). The above weight percentages are based upon the total weight of poly(arylene sulfide), reinforcement and silane in the composition. An example of such a composition is given as composition B in the example. Special encapsulation compositions are described in 3. below.

3. Special Encapsulation Compositions

Poly(arylene sulfide) compositions, which are especially well suited for successful use as encapsulation compositions, comprise the following:
(a) poly(arylene sulfide),
(b) at least one silane (formula I),
(c) reinforcement, and
(d) filler.
These compositions can optionally contain, in addition to (a), (b), (c) and (d) above, relatively small amounts of other components such as, for example, hydrogenated conjugated diene/monovinyl-substituted aromatic copolymers, zinc oxide, organosilanes, pigments, flow improvers, additives, processing aids, etc. These compositions are described in more detail in A and B below.

It should be noted that the first list of electronic components given in 2. above includes both active components (such as, for example, integrated circuits, transistors and diodes) and passive components (such as, for example, capacitors, resistors and resistor networks). The distinction is frequently important and is often determinative of the type of poly(arylene sulfide) encapsulation composition best suited for encapsulation of the component. Accordingly, compositions for the encapsulation of active and passive components are described separately in A and B below.

A. Compositions for the Encapsulation of Active Components

Compositions used for the encapsulation of active components can be prepared in accordance with the following weight percentages:

(a) Poly(arylene sulfide): about 25 to about 45 wt % broad range, about 32 to about 38 wt % preferred range.
(b) At least one silane (formula I): about 0.1 to about 10 wt % broad range, about 0.5 to about 5 wt % preferred range.
(c) Reinforcement: about 5 to about 30 wt % broad range, about 10 to about 20 wt % preferred range.
(d) Filler: about 40 to about 60 wt % broad range, about 45 to about 55 wt % preferred range.

The above weight percentages are based upon the total amount of (a), (b), (c) and (d) in the composition. Other components, including those previously identified, can optionally be present.

The broad ranges represent the ranges within which the composition should be confined in order to obtain good results. The preferred ranges are preferred because they define a composition possessing the physical, chemical and electrical properties best suited for its intended encapsulation purposes.

Although our invention is not limited thereto the viscosity of the composition used for encapsulation of active components should generally not exceed about 800 poise (as tested on a capillary rheometer at 650° F. and at a shear rate of 1000 $(sec)^{-1}$). Encapsulation of active electronic components with compositions having viscosities in excess of about 800 poise can cause damage to the components. It is contemplated that the viscosity of the composition will generally range from about 150 to about 500 poise for active components other than very delicate components such as, for example, integrated circuits with wire leads. With respect to very delicate components such as, for example integrated circuits with wire leads, the viscosity of the encapsulation composition should be below about 150 poise (as tested on a capillary rheometer at 650° F. at a shear rate of 1000 $(sec)^{-1}$). Encapsulation of integrated circuits with compositions any higher in viscosity can cause wire wash (i.e., breaking of the wires of the integrated circuit). It is contemplated that the viscosity of the composition for the encapsulation of such integrated circuits and the like will generally range from about 75 to about 150 poise.

Although viscosity of the composition depends on a number of factors, to obtain composition viscosities below about 800 poise the viscosity of the poly(arylene sulfide) should generally not exceed about 130 poise (as tested on a capillary rheometer at 650° F. and at a shear rate of 1000 $(sec)^{-1}$). It is contemplated that the viscosity of the poly(arylene sulfide) will, in most applications, range up to about 70 poise. To obtain composition viscosities within the desired range for delicate active components such as, for example, integrated circuits with wire leads, the viscosity of the poly(arylene sulfide) should generally be less than about 25 poise (as tested on a capillary rheometer at 650° F. and at a shear rate of 1000 $(sec)^{-1}$).

The reinforcements can be, for example, glass fibers of calcium silicate fibers.

The filler can be, for example, silica. The silica can be amorphous silica or crystalline silica. Silica is commercially available as a finely ground material having a relatively narrow particle size distribution ranging from about 1 to about 100 micrometers.

Other fillers include, for example, talc, glass, clay, mica, calcium sulfate and calcium carbonate.

The preferred encapsulation composition for active components is prepared from:

(a) about 32 to about 38 wt % poly(phenylene sulfide) (viscosity less than about 130 poise as tested on a capillary rheometer at 650° F. and at a shear rate of about 1000 $(sec)^{-1}$),
(b) about 0.5 to about 5 wt % silane (formula I),
(c) about 10 to about 20 wt % glass fibers or calcium silicate fibers, and
(d) about 45 to about 55 wt % silica.

The above weight percentages are based upon the total amount of (a), (b), (c) and (d) in the composition. Other components, including those previously identified, can optionally be present.

If the viscosity of the poly(phenylene sulfide) is below about 25 poise (as tested on a capillary rheometer at 650° F. and at a shear rate of 1000 $(sec)^{-1}$) this composition is especially well suited for the encapsulation of integrated circuits with wire leads. Accordingly, integrated circuits encapsulated with this composition, represent one embodiment of my invention.

B. Compositions for the Encapsulation of Passive Components

Compositions used for the encapsulation of passive components can be prepared in accordance with the following weight percentages:

(a) Poly(arylene sulfide): about 25 to about 45 wt % broad range, about 32 to about 38 wt % preferred range.
(b) At least one silane (formula I): about 0.1 to about 10 wt % broad range, about 0.5 to about 5 wt % preferred range.
(c) Reinforcement: about 20 to about 50 wt % broad range, about 25 to about 45 wt % preferred range.
(d) Filler: about 18 to about 38 wt % broad range, about 23 to about 33 wt % preferred range.

The above weight percentages are based upon the total amount of (a), (b), (c) and (d) in the composition. Other components, including those previously identified, can optionally be present.

The broad ranges represent the ranges within which the composition should be confined in order to obtain good results. The preferred ranges are preferred because they define a composition possessing the physical, chemical and electrical properties best suited for its intended encapsulation purposes.

Although our invention is not limited thereto the viscosity of the composition used for encapsulation of passive components should generally not exceed about 1200 poise (as tested on a capillary rheometer at 650° F. and at a shear rate of 1000 $(sec)^{-1}$). Encapsulation of passive electronic components with compositions having viscosities in excess of about 1200 poise can cause damage to the components. It is contemplated that the viscosity of the composition will generally range from about 500 to about 800 poise.

To obtain composition viscosities within the desired ranges the viscosity of the poly(arylene sulfide) should generally not exceed about 300 poise (as tested on a capillary rheometer at 650° F. and at a shear rate of 1000 (sec)$^{-1}$). It is contemplated that the viscosity of the poly(arylene sulfide) will generally range from about 190 to about 300 poise.

The reinforcements can be, for example, glass fibers or calcium silicate fibers.

The preferred filler is talc because of its availability and ability to improve the dimensional stability, thermal conductivity and mechanical strength of the composition. In place of talc, or in combination with talc, other fillers can be used. Examples of such suitable fillers include, silica, calcium sulfate, calcium carbonate, clay, glass and mica. Calcium sulfate is especially useful in compositions used to encapsulate connectors.

The preferred encapsulation composition for passive components is prepared from:

(a) about 32 to about 38 wt % poly(phenylene sulfide) (viscosity less than about 300 poise as tested on a capillary rheometer at 650° F. and at a shear rate of about 1000 (sec)$^{-1}$), (b) about 0.5 to about 5 wt % silane (formula I), (c) about 25 to about 45 wt % glass fibers or calcium silicate fibers, and (d) about 23 to about 33 wt % talc.

The above weight percentages are based upon the total amount of (a), (b), (c) and (d) in the composition. Other components, including those previously identified, can optionally be present.

This composition is especially well suited for, but not limited to, the encapsulation of capacitors. Accordingly, capacitors, encapsulated with this composition, represent an embodiment of my invention.

4. How to Make

Suitable silanes can be obtained from Union Carbide Corporation under the product name Union Carbide Organofunctional Polysulfide Silane Y-9194. Silane Y-9194 is a mixture of compounds within formula I wherein $R_1$ and $R_2$ are —$CH_3$; wherein $R_3$ and $R_4$ are —$CH_2CH_2$—; wherein $R_5$, $R_6$, $R_7$, $R_8$, $R_9$ and $R_{10}$ are —$CH_2CH_3$; wherein $x=1$ and $y=1$; and wherein the average value of n is about 2.8. Use of Silane Y-9194 represents the best mode of this invention as presently contemplated by the inventor. Other compounds within the scope of formula I can be made by modification of Silane Y-9194 or through separate synthesis routes. Persons skilled in the art can employ known techniques of silicon esterification, aromatic substitution, etc. to produce the compounds of formula I in a variety of ways. The method employed in making the silanes of formula I is immaterial to the practice of this invention.

The compositions of this invention can be made in accordance with any method wherein the poly(arylene sulfide), silane(s) (formula I) and other components (if any) are combined to form a mixture. Many suitable methods are well known to those of skill in the art. By way of example, the components of the composition can be mixed together at room temperature in a rotating drum blender or in an intensive mixer such as a Henschel mixer and then extrusion compounded at a temperature above about the melting point of the poly(arylene sulfide) to produce a uniform blend.

Once made, the composition can be used to encapsulate electronic components in accordance with any encapsulation method suitable for thermoplastic encapsulation compositions. Such methods are well known in the art. The composition can be heated to a temperature of at least about the melting point of the poly(arylene sulfide) and then used to encapsulate electronic components. The composition can, for example, be introduced into an injection molding apparatus to produce a melt which is extruded into an injection mold wherein the electronic component to be encapsulated is positioned. Transfer molding processes are also acceptable.

The following example is presented to facilitate disclosure of this invention and should not be interpreted to unduly limit its scope.

EXAMPLE

In this example four poly(phenylene sulfide) compositions (identified as A, B, C and D) are compared. Compositions A and C were prepared without the silane. Compositions B and D were prepared using Silane Y-9194. Since Y-9194 is a mixture of silanes within formula I wherein $R_1$ and $R_2$ are —$CH_3$; wherein $R_3$ and $R_4$ are —$CH_2CH_2$—; wherein $R_5$, $R_6$, $R_7$, $R_8$, $R_9$ and $R_{10}$ are —$CH_2CH_3$; wherein $x=1$ and $y=1$; and wherein the average value of n for the mixture is about 2.8. The components of each composition are given below in Table 1.

TABLE 1

| Components | Weight Percentages[g] Composition: | | | |
|---|---|---|---|---|
| | A | B | C | D |
| poly(phenylene sulfide)[a] | 60 | 59 | 35 | 35 |
| fiberglass[b] | 40 | 40 | 35 | 35 |
| Silane Y-9194[c] | | 1 | | 1 |
| talc[d] | | | 28.6 | 27.6 |
| polyethylene[e] | | | .25 | .25 |
| pigment[f] | | | 1.15 | 1.15 |

[a]Ryton ®, Phillips Chemical Company
[b]Owens Corning Grade 197
[c]Union Carbide Organofunctional Polysulfide Silane Y-9194
[d]Type 2620 Talc, Riblin, Dallas, Tx.
[e]Marlex ®, Phillips Chemical Company
[f]Mixture of inorganic pigments
[g]The weight percentages are based on the total weight of the components in the composition.

Each composition was prepared as follows. The specified components were charged to a Henschel mixer and mixed until completely dispersed. The mixture was passed through a Buss-Condux cokneader extruder at 570°–600° F. and pelletized. The pelletized product was injection molded using a 35 ton Arbrug molding machine (650° F. stock temperature, 6000 psi and 275° F. mold temperature into flat test specimens (2.5 inches×2.5 inches×0.125 inches).

The flat test specimens were used to determine the electrical insulation resistance of the composition. Three holes, each 0.25 inches in diameter and located in a triangular pattern about 1.25 inches apart, were drilled in the disc. A metal bolt (with nut and washer) was attached through each hole. A single tinned copper wire was attached to each bolt. The wired specimens were conditioned for 48 hours in a 95±1% relative humidity chamber at 90° C. After the 48 hours exposure the resistance between each pair of leads at a potential of 500 volts AC was measured using a Gen Rad Megohmeter (type 1864) having the capability to measure resistance up to $2\times10^{14}$ohm. For each pair of leads two measurements were made, i.e. a first measurement and a second measurement about 1 minute after the first. After all three pairs of leads had been measured the average value of the first measurements was calculated and the average value of the second measurements was calculated. Resistance readings were again taken after 192 hrs., 384 hrs. and 787 hrs. The average electrical insulation resistance for the 1 minute measurement is shown in Table II.

TABLE II

| Composition | Insulation Resistance Ω | | | |
|---|---|---|---|---|
| | 48 hrs. | 192 hrs. | 384 hrs. | 787 hrs. |
| A | $4.5 \times 10^{10}$ | $2.5 \times 10^9$ | $6.1 \times 10^8$ | $2.3 \times 10^8$ |
| B | $5.3 \times 10^{13}$ | $7.5 \times 10^{12}$ | $3.2 \times 10^{12}$ | $1.9 \times 10^{12}$ |
| C | $1.6 \times 10^{11}$ | $5.5 \times 10^{10}$ | $4.1 \times 10^{10}$ | $3.1 \times 10^{10}$ |
| D | $4.7 \times 10^{13}$ | $1.1 \times 10^{13}$ | $5.6 \times 10^{12}$ | $4.1 \times 10^{12}$ |

The data clearly show that compositions B and D which contained Silane Y-9194 consistently exhibited signficantly higher insulation resistance than compositions A and C.

I claim:

1. A composition of matter comprising
(a) poly(arylene sulfide),
(b) at least one silane within the formula:

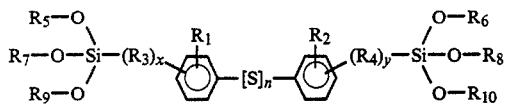

wherein n is an integer from 1 to 30; wherein each of $R_1$ and $R_2$ is H or an alkyl group having 1 to 30 atoms; wherein each of $R_5$, $R_6$, $R_7$, $R_8$, $R_9$ and $R_{10}$ is an alkyl group having from 1 to 30 carbon atoms; wherein x is 0 or 1; wherein y is 0 or 1; and wherein each of $R_3$ and $R_4$ is an alkylene group having from 1 to 30 carbon atoms and
(c) glass.

2. A composition according to claim 1 wherein the weight ratio of (a) to (b) is greater than about 2 to 1 and less than about 5,000 to 1.

3. A composition according to claim 2 wherein n is an integer from 1 to 10; wherein each of $R_1$ and $R_2$ is H or an alkyl group having 1 to 10 carbon atoms; wherein each of $R_5$, $R_6$, $R_7$, $R_8$, $R_9$ and $R_{10}$ is an alkyl group having from 1-10 carbon atoms; wherein x=1; wherein y=1; and wherein each of $R_3$ and $R_4$ is an alkylene group having from 1 to 10 carbon atoms.

4. A composition according to claim 2 wherein n is an integer from 1 to 5; wherein each of $R_1$ and $R_2$ is H or an alkyl group having 1 to 5 carbon atoms; wherein each of $R_5$, $R_6$, $R_7$, $R_8$, $R_9$ and $R_{10}$ is an alkyl group having from 1 to 5 carbon atoms; and wherein each of $R_3$ and $R_4$ is an alkylene group having from 1 to 5 carbon atoms.

5. A composition according to claim 2 wherein (a) is poly(phenylene sulfide); wherein each of $R_1$ and $R_2$ is —$CH_3$; wherein each of $R_5$, $R_6$, $R_7$, $R_8$, $R_9$, and $R_{10}$ is —$CH_2CH_3$; wherein x=1; wherein y=1; and wherein each of $R_3$ and $R_4$ is —$CH_2CH_2$—.

6. A composition according to claim 5 wherein (b) is a plurality of silanes within said formula; and wherein the average value of n for said plurality of silanes is about 2 to about 4.

7. A composition according to claim 6 wherein said average value for n is about 2.8.

8. A composition according to claim 6 wherein the weight ratio of (a) to (b) is greater than about 7 to 1 and less than about 500 to 1.

9. A composition according to claim 3 wherein (a) is poly(phenylene sulfide); and wherein the weight ratio of (a) to (b) is greater than about 7 to 1 and less than about 500 to 1.

10. A composition according to claim 9 wherein said composition further comprises (d) reinforcement.

11. A composition according to claim 1 wherein said composition further comprises (d) reinforcement; wherein the amount of (a) ranges from about 50 to about 70 weight percent; wherein the amount of (b) ranges from about 0.1 to about 5 weight percent; wherein the amount of (d) ranges from about 30 to about 50 weight percent; and wherein said weight percentages are based upon the total weight of (a), (b) and (d).

12. A composition according to claim 11 wherein (c) is glass fibers.

13. A composition consisting of
(a) poly(arylene sulfide),
(b) at least one silane,
(c) other material;
wherein the amount of said other material does not exceed about 90 weight percent based upon the total weight of (a), (b) and (c); and wherein said at least one silane is within the formula:

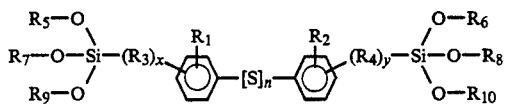

wherein n is an integer from 1 to 30; wherein each of $R_1$ and $R_2$ is H or an alkyl group having 1 to 30 carbon atoms; wherein each of $R_5$, $R_6$, $R_7$, $R_8$, $R_9$ and $R_{10}$ is an alkyl group having from 1 to 30 carbon atoms; wherein x is 0 or 1; wherein y is 0 or 1; and wherein each of $R_3$ and $R_4$ is an alkylene group having from 1 to 30 carbon atoms and
(d) glass.

14. A composition according to claim 13 wherein said other material includes filler and reinforcement.

15. A composition according to claim 14 wherein said other material includes zinc oxide.

16. A composition according to claim 14 wherein (a) is poly(phenylene sulfide); wherein n is an integer from 1 to 5; wherein each of $R_1$ and $R_2$ is H or an alkyl group having 1 to 5 carbon atoms; wherein each of $R_5$, $R_6$, $R_7$, $R_8$, $R_9$ and $R_{10}$ is an alkyl group having from 1 to 5 carbon atoms; wherein each of $R_3$ and $R_4$ is an alkylene group having from 1 to 5 carbon atoms; and, wherein the amount of said other material does not exceed about 75 weight percent based upon the total weight of (a), (b) and (c).

17. A composition comprising
(a) poly(arylene sulfide)
(b) at least one silane;
wherein (b) is present in an amount sufficient to impart improved insulation resistance to said composition; wherein (b) is within the formula:

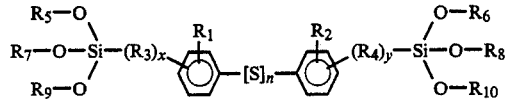

wherein n is an integer from 1 to 30; wherein each of $R_1$ and $R_2$ is H or an alkyl group having 1 to 30 carbon atoms; wherein each of $R_5$, $R_6$, $R_7$, $R_8$, $R_9$ and $R_{10}$ is an alkyl group having from 1 to 30 carbon atoms; wherein x is 0 or 1; wherein y is 0 to 1; and wherein each of $R_3$ and R$_4$ is an alkylene group having from 1 to 30 carbon atoms and
  (c) glass.
18. A composition according to claim 17 wherein (a) is poly(phenylene sulfide).
19. A composition for encapsulating an active electronic component comprising:
  (a) about 25 to about 45 weight percent poly(arylene sulfide),
  (b) about 0.1 to about 10 weight percent of at least one silane,
  (c) about 5 to about 30 weight percent reinforcement, and
  (d) about 40 to about 60 weight percent filler;
wherein said weight percentages are based upon the total weight of (a), (b), (c) and (d); wherein the viscosity of said composition does not exceed about 800 poise as tested on a capillary rheometer at 650° F. and at a shear rate of 1000 (sec)$^{-1}$; wherein (b) is within the formula:

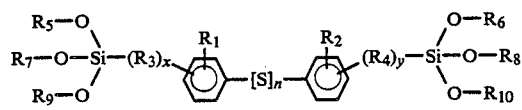

wherein n is an integer from 1 to 30; wherein each of R$_1$ and R$_2$ is H or an alkyl group having 1 to 30 carbon atoms; wherein each of R$_5$, R$_6$, R$_7$, R$_8$, R$_9$ and R$_{10}$ is an alkyl group having from 1 to 30 carbon atoms; wherein x is 0 or 1; wherein y is 0 or 1; and wherein each of R$_3$ and R$_4$ is an alkylene group having from 1 to 30 carbon atoms.

20. A composition in accordance with claim 19 wherein said filler is silica; and wherein said reinforcement is glass fibers or calcium silicate fibers.

21. A composition in accordance with claim 19 wherein (a) is poly(phenylene sulfide).

22. A composition in accordance with claim 21 wherein said composition further comprises zinc oxide.

23. A composition in accordance with claim 17 wherein said viscosity of said composition does not exceed about 150 poise.

24. A composition in accordance with claim 19 wherein n is an integer from 1 to 5; wherein each of R$_1$ and R$_2$ is H or an alkyl group having 1 to 5 carbon atoms; wherein each of R$_5$, R$_6$, R$_7$, R$_8$, R$_9$ and R$_{10}$ is an alkyl group having from 1 to 5 carbon atoms; and wherein each of R$_3$ and R$_4$ is an alkylene group having from 1 to 5 carbon atoms.

25. A composition according to claim 19 wherein (a) is poly(phenylene sulfide); wherein (b) is a plurality of silanes within said formula; and wherein the average value of n for said plurality of silanes is about 2 to about 4; wherein each of R$_1$ and R$_2$ is —CH$_3$; wherein each of R$_5$, R$_6$, R$_7$, R$_8$, R$_9$ and R$_{10}$ is —CH$_2$CH$_3$; wherein x=1; wherein y=1; and wherein each of R$_3$ and R$_4$ is —CH$_2$CH$_2$—.

26. A composition for encapsulating passive electronic components comprising:
  (a) about 25 to about 45 weight percent poly(arylene sulfide),
  (b) about 0.1 to about 10 weight percent of at least one silane,
  (c) about 20 to about 50 weight percent reinforcement, and
  (d) about 18 to about 38 weight percent filler;
wherein said weight percentages are based upon the total weight of (a), (b), (c) and (d);
wherein the viscosity of said composition does not exceed about 1200 poise as tested on a capillary rheometer at 650° F. and at a shear rate of 1000 (sec)$^{-1}$; wherein (b) is within the formula:

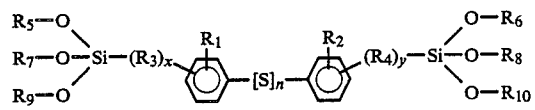

wherein n is an integer from 1 to 30; wherein each of R$_1$ and R$_2$ is H or an alkyl group having 1 to 30 carbon atoms; wherein each of R$_5$, R$_6$, R$_7$, R$_8$, R$_9$ and R$_{10}$ is an alkyl group having from 1 to 30 carbon atoms; wherein x is 0 or 1; wherein y is 0 or 1; and wherein each of R$_3$ and R$_4$ is an alkylene group having from 1 to 30 carbon atoms.

27. A composition in accordance with claim 26 wherein said poly(arylene sulfide) is poly(phenylene sulfide).

28. A composition in accordance with claim 27 wherein said reinforcement is selected from glass fibers and calcium silicate fibers.

29. A composition in accordance with claim 28 wherein (a) is poly(phenylene sufide).

30. A composition in accordance with claim 26 wherein said filler is talc.

31. A composition in accordance with claim 27 wherein said filler is calcium sulfate.

32. A composition in accordance with claim 26 further comprising zinc oxide.

33. A composition in accordance with claim 26 wherein n is an integer from 1 to 5; wherein each of R$_1$ and R$_2$ is H or an alkyl group having 1 to 5 carbon atoms; wherein each of R$_5$, R$_6$, R$_7$, R$_8$, R$_9$ and R$_{10}$ is an alkyl group having from 1 to 5 carbon atoms; and wherein each of R$_3$ and R$_4$ is an alkylene group having from 1 to 5 carbon atoms.

34. A composition according to claim 26 wherein (a) is poly(phenylene sulfide); wherein (b) is a plurality of silanes within said formula; and wherein the average value of n for said plurality of silanes is about 2 to about 4; wherein each of R$_1$ and R$_2$ is —CH$_3$; wherein each of R$_5$, R$_6$, R$_7$, R$_8$, R$_9$ and R$_{10}$ is —CH$_2$CH$_3$; wherein x=1; wherein y=1; and wherein each of R$_3$ and R$_4$ is —CH$_2$CH$_2$—.

35. An article of manufacture comprising an electronic component encapsulated with the composition of claim 2.

36. An article of manufacture as recited in claim 35 wherein said electronic component is selected from the group consisting of capacitors, resistors, resistor networks, integrated circuits, transistors, diodes, triodes, thyristors, coils, varistors, connectors, condensers, transducers, crystal oscillators, fuses, rectifiers, power supplies, and microswitches.

37. An article of manufacture comprising an electronic component encapsulated with the composition of claim 4.

38. An article of manufacture comprising an electronic component encapsulated with the the composition of claim 6.

39. An article of manufacture comprising an electronic component at least partially made from the composition of claim 11.

40. An article of manufacture comprising an electronic component encapsulated with the composition of claim 13.

41. An article of manufacture comprising an electronic component encapsulated with the composition of claim 16.

42. An article of manufacture comprising an electronic component encapsulated with the composition of claim 17.

43. An article of manufacture comprising an electronic component encapsulated with the composition of claim 18.

44. An article of manufacture comprising an electronic component encapsulated with the composition of claim 19.

45. An article of manufacture comprising an electronic component encapsulated with the composition of claim 21.

46. An integrated circuit with wire leads encapsulated with the composition of claim 23.

47. An article of manufacture comprising an electronic component encapsulated with the composition of claim 25.

48. An article of manufacture comprising an electronic component encapsulated with the composition of claim 26.

49. A capacitor encapsulated with the composition of claim 30.

50. An article of manufacture comprising an electronic component encapsulated with the composition of claim 33.

51. A method comprising:
(a) producing a mixture comprising at least (i) poly(arylene sulfide), (ii) at least one silane and (iii) glass and
(b) heating said mixture to a temperature of at least about the melting point of said poly(arylene sulfide); wherein (ii) is within the formula:

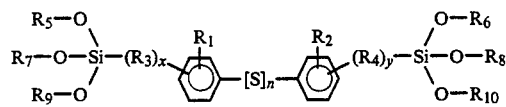

wherein n is an integer from 1 to 30; wherein each of $R_1$ and $R_2$ is H or an alkyl group having 1 to 30 carbon atoms; wherein each of $R_5$, $R_6$, $R_7$, $R_8$, $R_9$ and $R_{10}$ is an alkyl group having from 1 to 30 carbon atoms; wherein x is 0 or 1; wherein y is 0 or 1; and wherein each of $R_3$ and $R_4$ is an alkylene group having from 1 to 30 carbon atoms.

52. A method according to claim 51 wherein said mixture further comprises filler and reinforcement; and wherein (i) is poly(phenylene sulfide).

53. The composition produced by the method of claim 51.

54. The composition produced by the method of claim 52.

55. A method according to claim 51 further comprising (c) encapsulating an electronic component with said mixture.

* * * * *